US011223456B2

(12) United States Patent
Manolakos et al.

(10) Patent No.: US 11,223,456 B2
(45) Date of Patent: Jan. 11, 2022

(54) TRANSMISSION GAP CONFIGURATION

(71) Applicant: QUALCOMM Incorporated, San Diego, CA (US)

(72) Inventors: Alexandros Manolakos, San Diego, CA (US); Joseph Binamira Soriaga, San Diego, CA (US); Krishna Kiran Mukkavilli, San Diego, CA (US); Yeliz Tokgoz, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/276,428

(22) Filed: Feb. 14, 2019

(65) Prior Publication Data

US 2019/0260533 A1 Aug. 22, 2019

(30) Foreign Application Priority Data

Feb. 20, 2018 (GR) .............................. 20180100067

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04W 8/22* (2013.01); *H04W 24/10* (2013.01); *H04W 72/02* (2013.01); *H04W 72/0413* (2013.01); *H04L 5/0055* (2013.01); *H04L 5/0057* (2013.01); *H04W 72/1289* (2013.01)

(58) Field of Classification Search
CPC ... H04B 7/0456; H04L 5/0048; H04L 5/0092; H04L 5/0098; H04L 5/0035; H04L 5/0037; H04L 5/0055; H04L 5/0057; H04L 27/2666; H04W 24/10; H04W 72/02; H04W 72/0413; H04W 72/1289; H04W 8/22
See application file for complete search history.

(56) References Cited

U.S. PATENT DOCUMENTS 10,714,840 B1 * 7/2020 West .................. H01Q 21/0087
2011/0292854 A1 * 12/2011 Terry ...................... H04L 5/001
370/311

(Continued)

OTHER PUBLICATIONS

International Search Report and Written Opinion—PCT/US2019/018202—ISA/EPO—dated May 13, 2019.

*Primary Examiner* — Kan Yuen
(74) *Attorney, Agent, or Firm* — Qualcomm Incorporated

(57) ABSTRACT

Various aspects of the present disclosure generally relate to wireless communication. In some aspects, a user equipment may determine a transmission gap for a set of transmissions including a first type of transmission and a second type of transmission based at least in part on at least one of a sounding reference signal parameter, a numerology parameter, or an antenna parameter. In some aspects, the user equipment may transmit at least one transmission, the set of transmissions, in accordance with the transmission gap for the set of transmissions based at least in part on determining the transmission gap for the set of transmissions. Numerous other aspects are provided.

15 Claims, 11 Drawing Sheets

(51) Int. Cl.
*H04W 8/22* (2009.01)
*H04W 72/04* (2009.01)
*H04W 24/10* (2009.01)
*H04W 72/02* (2009.01)
*H04W 72/12* (2009.01)

(56) References Cited

U.S. PATENT DOCUMENTS

| | | | |
|---|---|---|---|
| 2014/0016620 A1* | 1/2014 | Singh | H04W 56/0005 370/336 |
| 2014/0241295 A1* | 8/2014 | Tang | H04L 1/0032 370/329 |
| 2015/0271763 A1 | 9/2015 | Balachandran et al. | |
| 2017/0064646 A1 | 3/2017 | Kim et al. | |
| 2017/0288833 A1* | 10/2017 | Islam | H04W 72/04 |
| 2017/0302419 A1* | 10/2017 | Liu | H04W 48/12 |
| 2017/0339712 A1 | 11/2017 | Rico et al. | |
| 2018/0048511 A1* | 2/2018 | Hakola | H04L 5/0048 |
| 2018/0368199 A1* | 12/2018 | Zeng | H04W 72/0413 |
| 2019/0159266 A1* | 5/2019 | Kim | H04W 74/0875 |
| 2019/0173607 A1* | 6/2019 | Liu | H04L 5/0044 |
| 2019/0229867 A1* | 7/2019 | Yi | H04L 5/0048 |
| 2019/0364449 A1* | 11/2019 | Yang | H04W 24/10 |
| 2019/0387548 A1* | 12/2019 | Kim | H04W 72/04 |
| 2020/0052853 A1* | 2/2020 | Qin | H04B 7/06 |
| 2021/0021391 A1* | 1/2021 | Wang | H04W 72/1268 |

* cited by examiner

TRANSMISSION GAP CONFIGURATION

CROSS-REFERENCE TO RELATED APPLICATIONS UNDER 35 U.S.C. § 19

This application claims priority to Greek Patent Application No. 20180100067, filed on Feb. 20, 2018, entitled "TECHNIQUES AND APPARATUSES FOR TRANSMISSION GAP CONFIGURATION," which is hereby expressly incorporated by reference herein.

TECHNICAL FIELD OF THE DISCLOSURE

Aspects of the technology described below generally relate to wireless communication, and more particularly to techniques and apparatuses for transmission gap configuration (e.g., for a transmission gap between a physical uplink control channel or a physical uplink shared channel and a sounding reference signal). Embodiments and techniques enable and provide wireless communication devices and systems configured for low latency scenarios and enhanced network coverage.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication may include determining a transmission gap for a set of transmissions including a first type of transmission and a second type of transmission based at least in part on at least one of a sounding reference signal parameter, a numerology parameter, or an antenna parameter. The method may include transmitting at least one transmission, of the set of transmissions, in accordance with the transmission gap for the set of transmissions based at least in part on determining the transmission gap for the set of transmissions.

In some aspects, a user equipment for wireless communication may include memory and one or more processors operatively coupled to the memory. The memory and the one or more processors may be configured to determine a transmission gap for a set of transmissions including a first type of transmission and a second type of transmission based at least in part on at least one of a sounding reference signal parameter, a numerology parameter, or an antenna parameter. The memory and the one or more processors may be configured to transmit at least one transmission, of the set of transmissions, in accordance with the transmission gap for the set of transmissions based at least in part on determining the transmission gap for the set of transmissions.

In some aspects, a non-transitory computer-readable medium may store one or more instructions for wireless communication. The one or more instructions, when executed by one or more processors of a user equipment, may cause the one or more processors to determine a transmission gap for a set of transmissions including a first type of transmission and a second type of transmission based at least in part on at least one of a sounding reference signal parameter, a numerology parameter, or an antenna parameter. The one or more instructions, when executed by one or more processors of a user equipment, may cause the one or more processors to transmit at least one transmission, of the set of transmissions, in accordance with the transmission gap for the set of transmissions based at least in part on determining the transmission gap for the set of transmissions.

In some aspects, an apparatus for wireless communication may include means for determining a transmission gap for a set of transmissions including a first type of transmission and a second type of transmission based at least in part on at least one of a sounding reference signal parameter, a numerology parameter, or an antenna parameter. In some aspects, the apparatus may include means for transmitting at least one transmission, of the set of transmissions, in accordance with the transmission gap for the set of transmissions based at least in part on determining the transmission gap for the set of transmissions.

In some aspects, a method of wireless communication, performed by a base station (B S), may include transmitting information identifying at least one of a sounding reference signal parameter, a numerology parameter, or an antenna parameter; and receiving at least one transmission, of a set of transmissions including a first type of transmission and a second type of transmission, in accordance with a transmission gap for the set of transmissions associated with the at least one of the sounding reference signal parameter, the numerology parameter, or the antenna parameter.

In some aspects, a BS for wireless communication may include memory and one or more processors operatively coupled to the memory. The memory and the one or more processors may be configured to transmit information identifying at least one of a sounding reference signal parameter, a numerology parameter, or an antenna parameter; and receive at least one transmission, of a set of transmissions including a first type of transmission and a second type of transmission, in accordance with a transmission gap for the set of transmissions associated with the at least one of the sounding reference signal parameter, the numerology parameter, or the antenna parameter.

In some aspects, a non-transitory computer-readable medium may store one or more instructions for wireless communication. The one or more instructions, when executed by one or more processors of a BS, may cause the one or more processors to: transmit information identifying at least one of a sounding reference signal parameter, a numerology parameter, or an antenna parameter; and receive at least one transmission, of a set of transmissions including a first type of transmission and a second type of transmission, in accordance with a transmission gap for the set of transmissions associated with the at least one of the sounding reference signal parameter, the numerology parameter, or the antenna parameter.

In some aspects, an apparatus for wireless communication may include means for transmitting information identifying at least one of a sounding reference signal parameter, a numerology parameter, or an antenna parameter; and means for receiving at least one transmission, of a set of transmissions including a first type of transmission and a second type of transmission, in accordance with a transmission gap for the set of transmissions associated with the at least one of the sounding reference signal parameter, the numerology parameter, or the antenna parameter.

Aspects generally include a method, apparatus, device, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
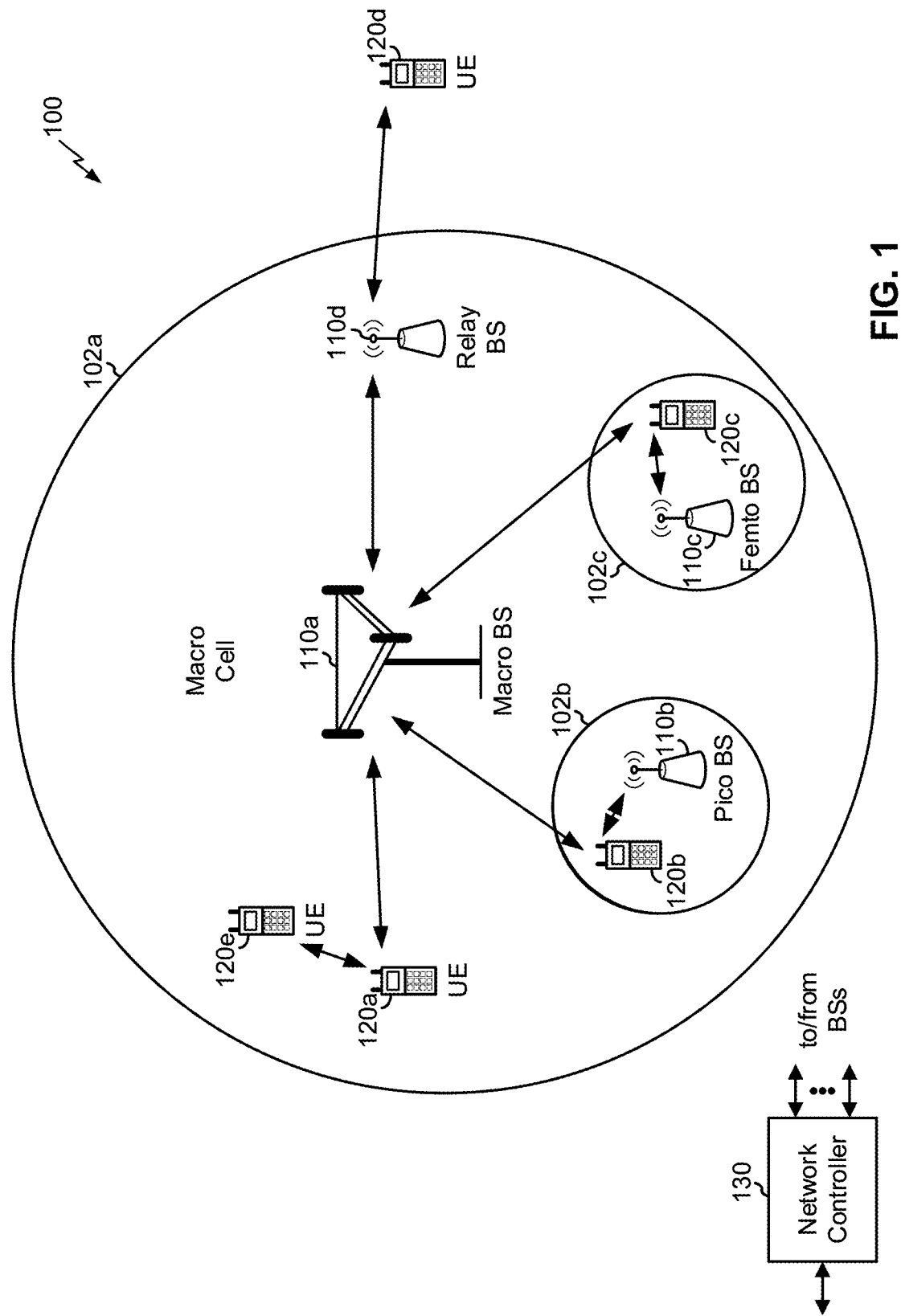
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. In some aspects, different UEs 120 may be configured to transmit in accordance with different sets of parameters, such as different antenna parameters, different numerologies, and/or the like.

As indicated above, FIG. 1 is provided merely as an example. Other examples may differ from what is described with regard to FIG. 1.

Figure 2:
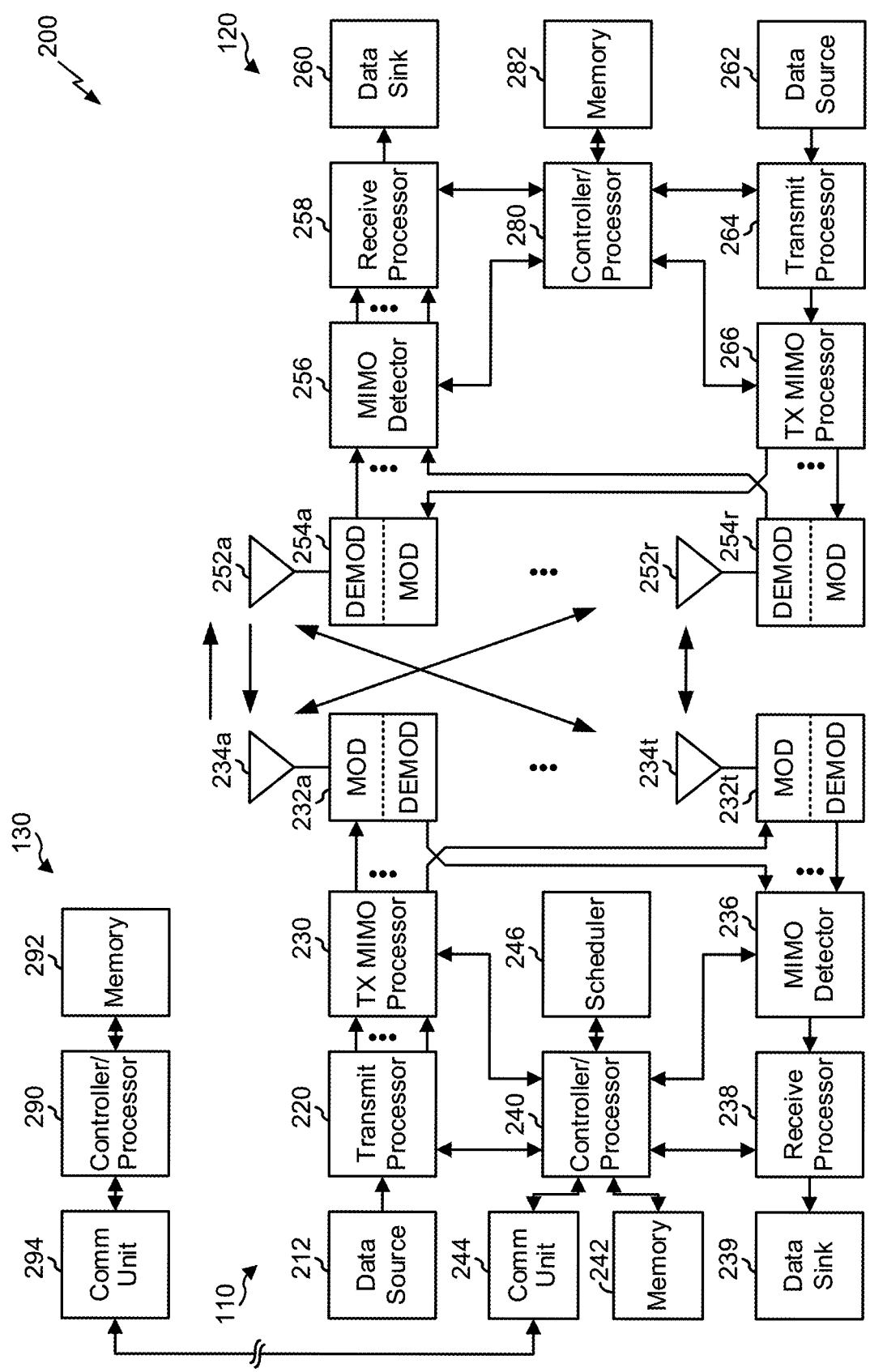
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, UE 120 may determine a transmission gap based at least in part on a received parameter, such as a received parameter identifying an antenna to use, a numerology for transmission, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with transmission gap configuration, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a transmission gap for a set of transmissions including a first type of transmission and a second type of transmission based at least in part on at least one of a sounding reference signal parameter or a numerology parameter, means for transmitting at least one transmission, of the set of transmissions, in accordance with the transmission gap for the set of transmissions based at least in part on determining the transmission gap for the set of transmissions, and/or the like. In some aspects, such means may include one or more components of UE 120 described in connection with FIG. 2.

In some aspects, BS 110 may include means for transmitting information identifying at least one of a sounding reference signal parameter, a numerology parameter, or an antenna parameter, means for receiving at least one transmission, of a set of transmissions including a first type of transmission and a second type of transmission, in accordance with a transmission gap for the set of transmissions associated with the at least one of the sounding reference signal parameter, the numerology parameter, or the antenna parameter, and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
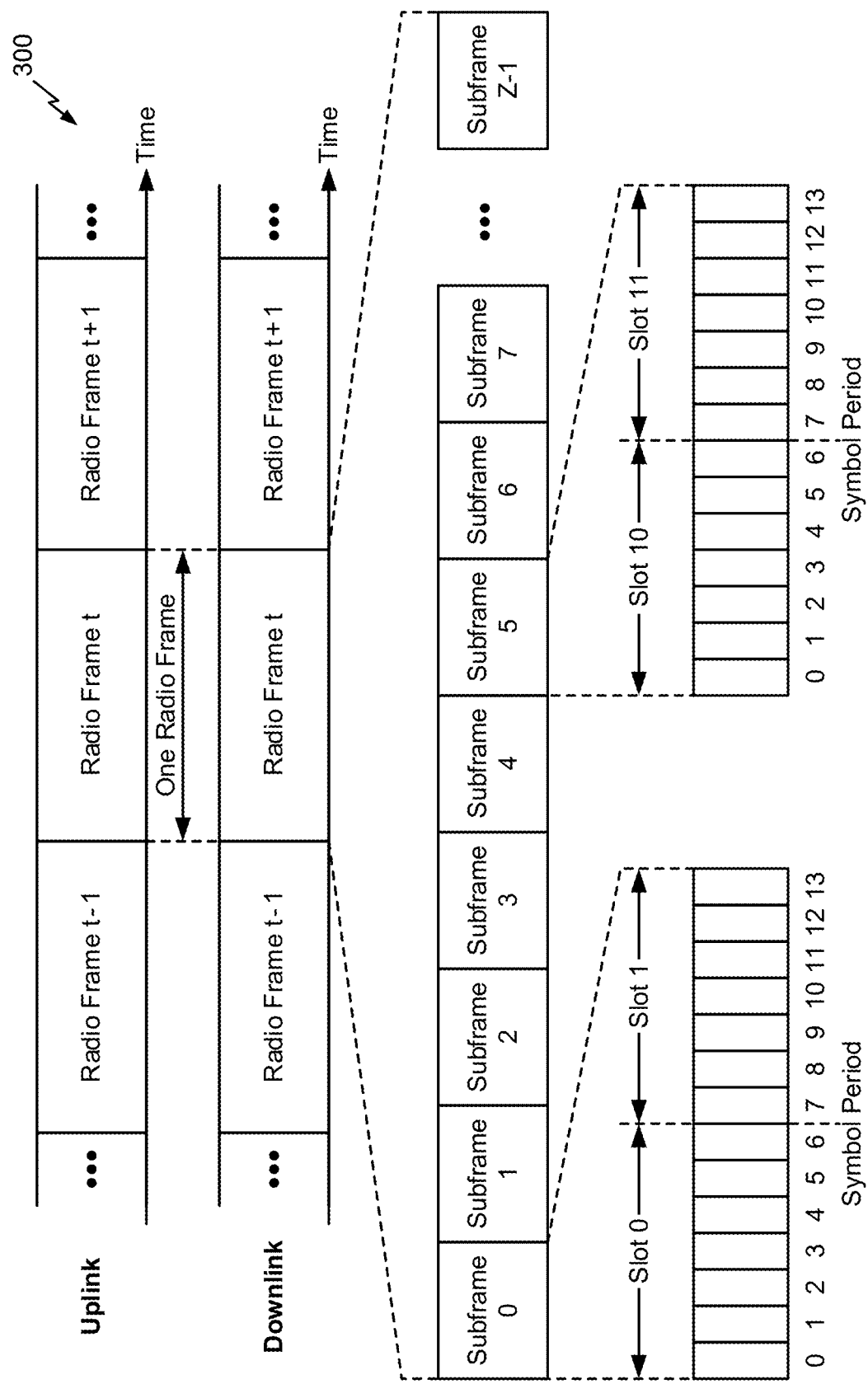
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
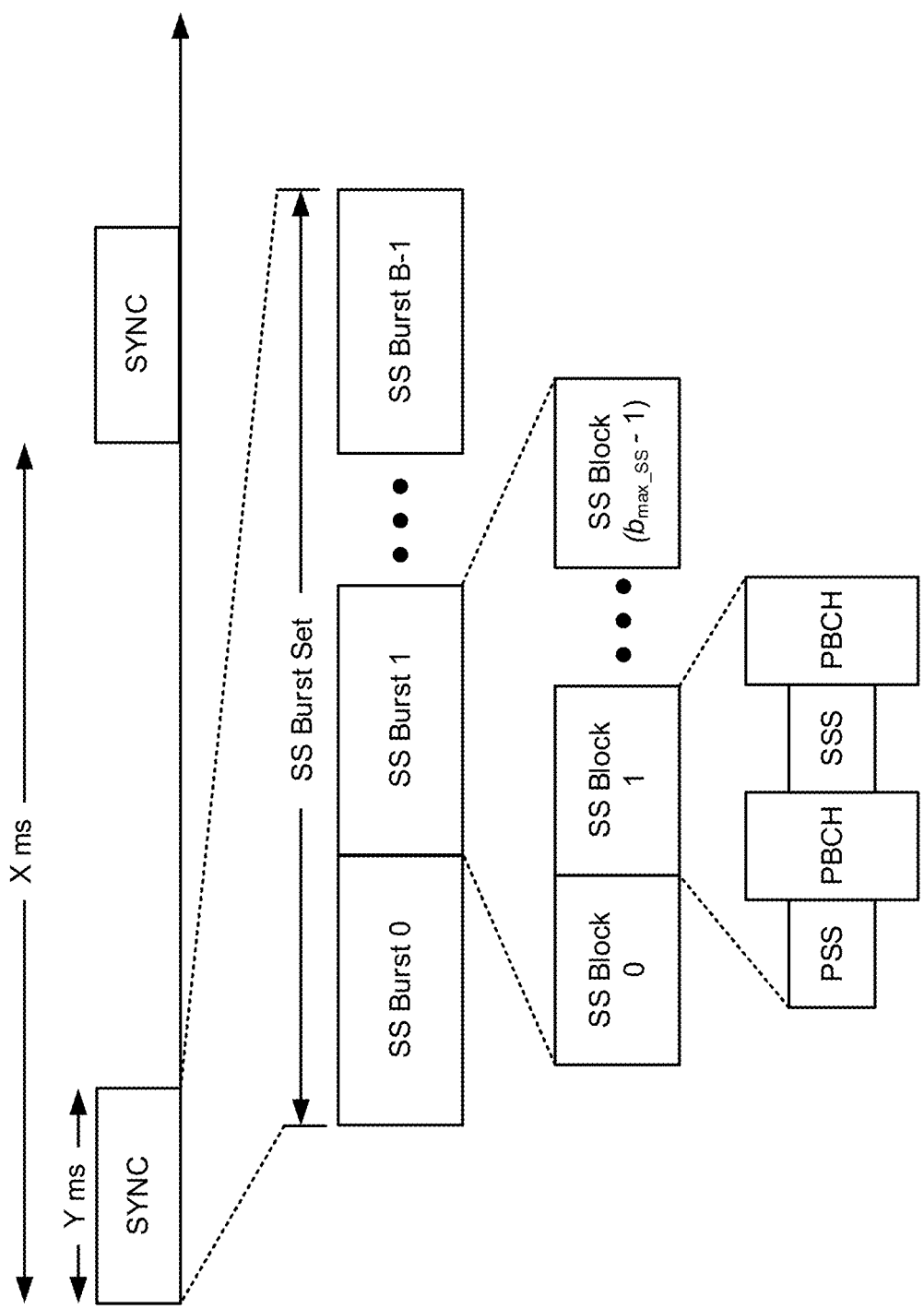
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
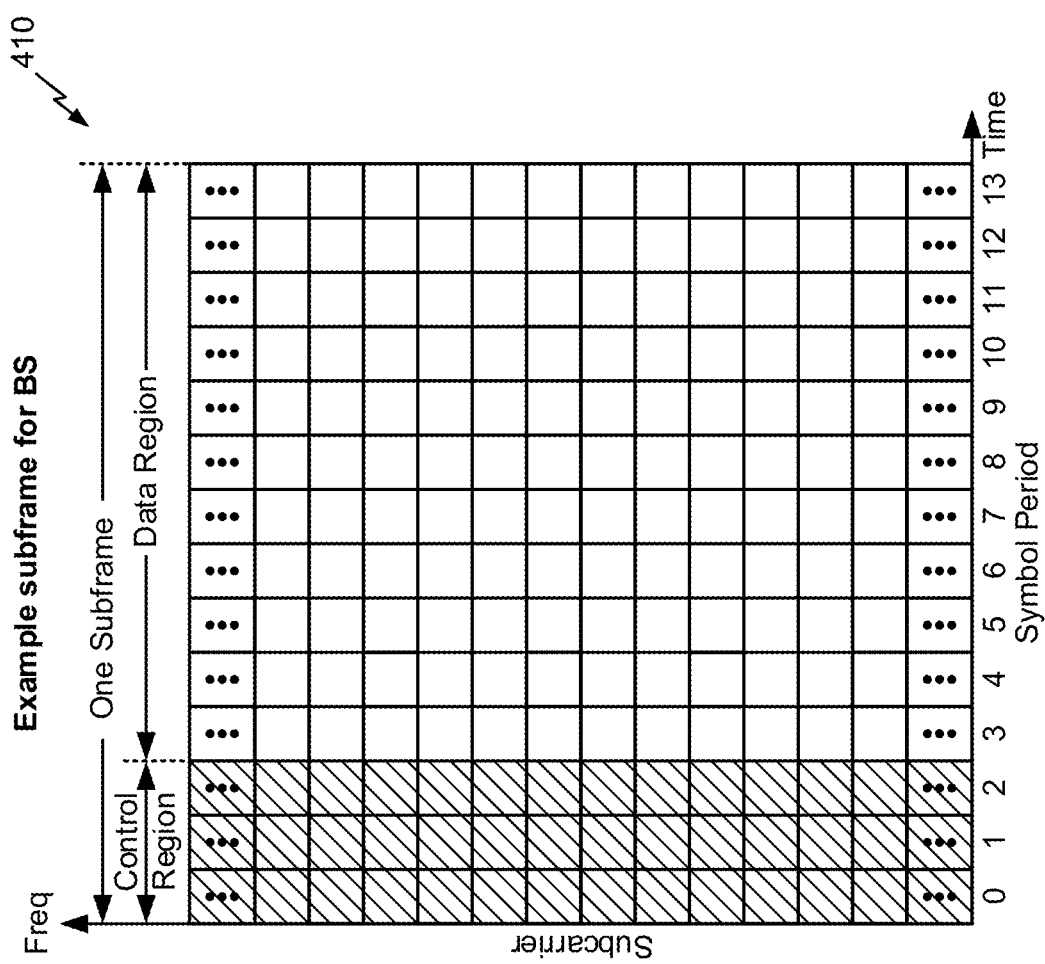
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
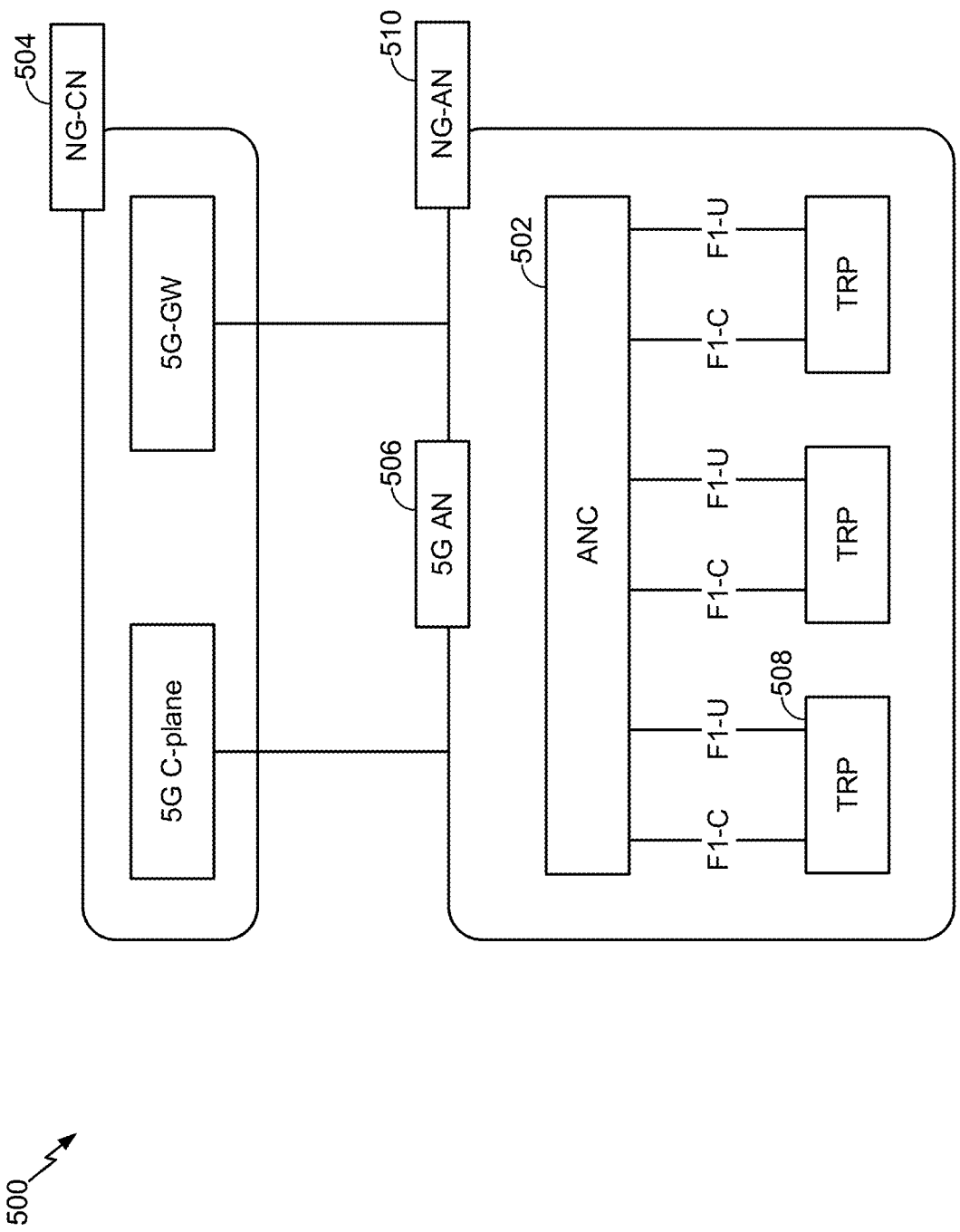
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs 508 may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
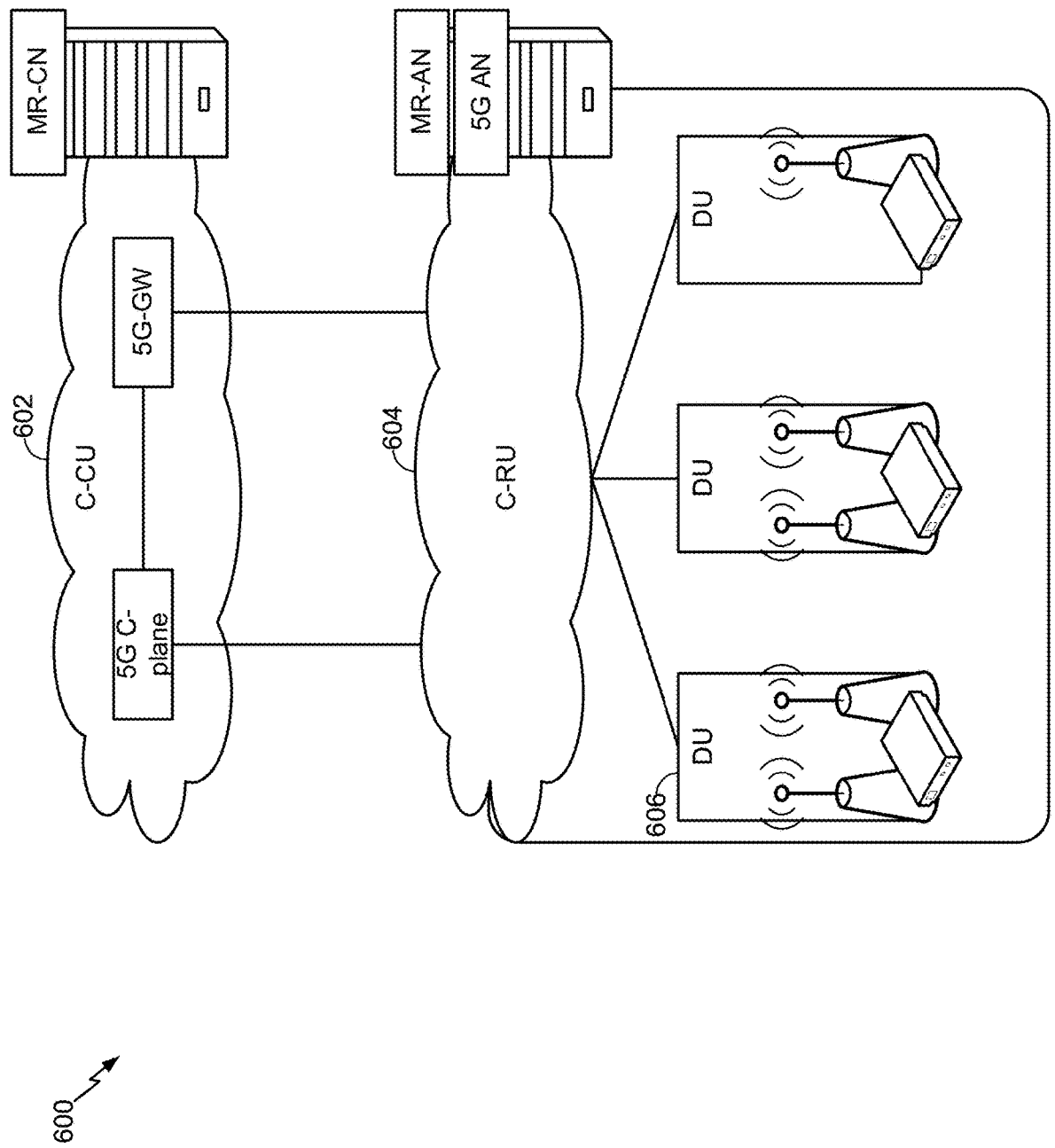
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
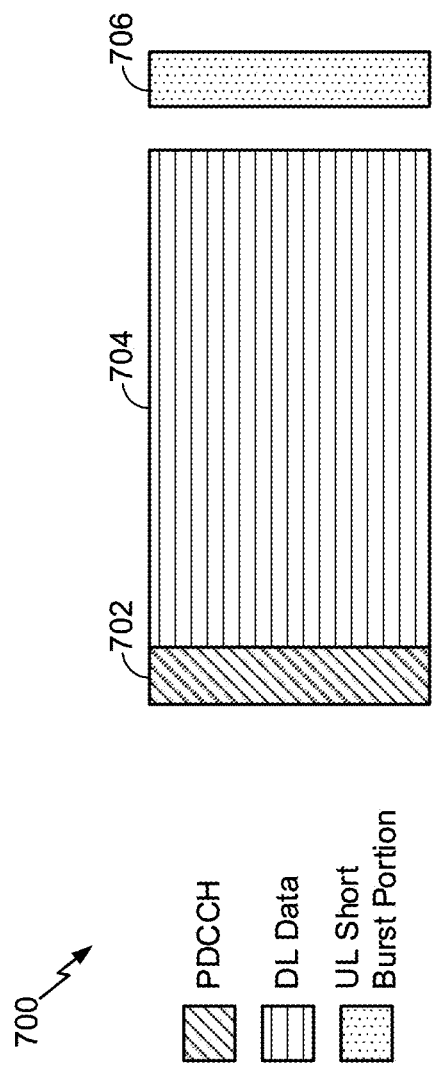
FIG. 7 is a diagram illustrating an example of a downlink (DL)-centric subframe, in accordance with various aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what is described with regard to FIG. 7.

Figure 8:
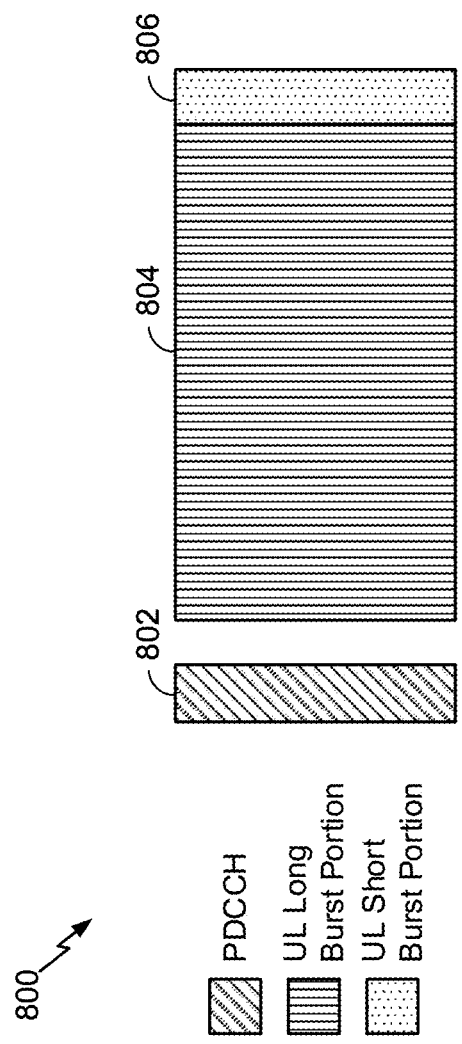
FIG. 8 is a diagram illustrating an example of an uplink (UL)-centric subframe, in accordance with various aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples may differ from what is described with regard to FIG. 8.

Some communications systems, such as NR, may support utilization of a plurality of ports and/or a plurality of antennas. For example, a UE may provide sounding reference signal (SRS) resources using a particular quantity of adjacent symbols and using up to four ports for each SRS resource. A transmission gap, such as a guard period, a transient period, and/or the like, may be configured for a particular quantity of symbols between a set of transmissions, such as transmissions associated with an SRS resource, transmissions associated with an uplink channel (e.g., a PUCCH, a PUSCH, and/or the like), and/or the like. During the transmission gap, the UE may not satisfy uplink transmission waveform quality requirements or transmit uplink signals. The transmission gap may enable, for example, a plurality of SRS resources to be transmitted in a single slot.

However, some antennas of a UE may be used concurrently, thereby obviating a need for a transmission gap. For example, when a UE is capable of uplink MIMO, the UE may use a plurality of antenna ports (termed an antenna port group) concurrently. By including the transmission gap when a plurality of antennas may be used concurrently, the UE may increase utilization of network resources, energy resources, and/or the like by extending a period of time during which the UE is configured to perform transmissions relative to concurrently transmitting using the plurality of antennas. Moreover, in some use cases, distortion and/or degradation of a transmission associated with an insufficient transmission gap may not interrupt the transmission. In other words, not including a transmission gap may result in the SRS or another type of transmission still being usable.

Some aspects, described herein, may enable transmission gap configuration. For example, a UE may determine a set of parameters, such as an SRS parameter (e.g., whether an SRS is for uplink codebook precoding, uplink non-codebook precoding, uplink analog beamforming, uplink antenna switching, and/or the like), a numerology parameter (e.g., a subcarrier spacing value, such as 15 kilohertz (KHz), 30 KHz, and/or the like), and/or the like. In this case, the UE may dynamically configure a transmission gap for a set of transmissions based at least in part on the set of parameters, and may transmit in accordance with the transmission gap. For example, the UE may include a transmission gap between an SRS and a PUCCH, an SRS and a PUSCH, and/or the like to reduce a likelihood of distortion associated with an SRS. Additionally, or alternatively, the UE may determine that a transmission gap is not needed, and may omit a transmission gap from a set of transmissions, thereby improving utilization of network resources, reducing utilization of energy resources, and/or the like relative to including a transmission gap when the transmission gap is not needed.

Figure 9:
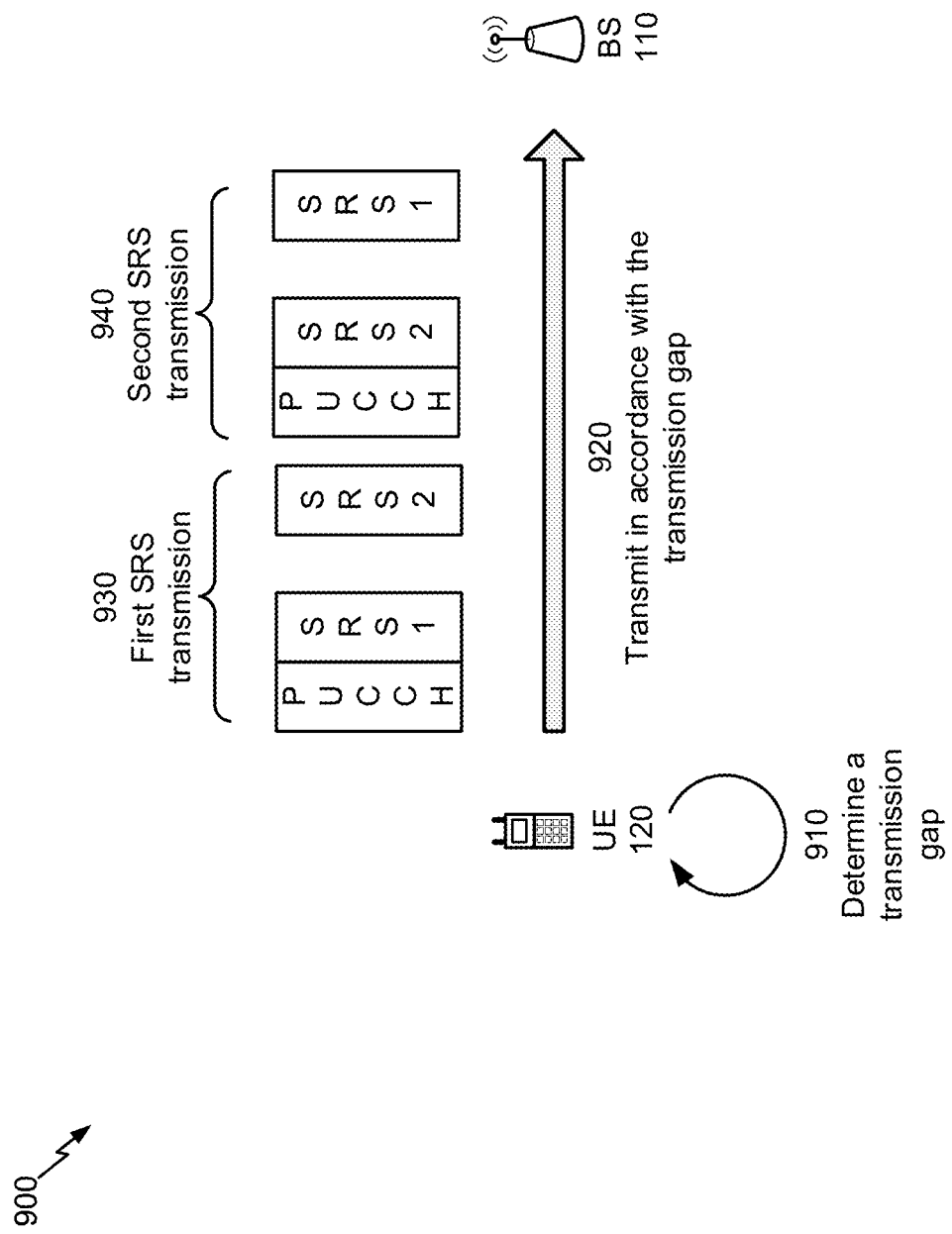
FIG. 9 is a diagram illustrating an example of transmission gap configuration, in accordance with various aspects of the present disclosure.

FIG. 9 is a diagram illustrating an example 900 of transmission gap configuration, in accordance with various aspects of the present disclosure. As shown in FIG. 9, example 900 includes a BS 110 and a UE 120.

As further shown in FIG. 9, and by reference number 910, UE 120 may determine a transmission gap (e.g., a transient period) between a first type of uplink transmission and a second type of uplink transmission (e.g., between a PUCCH and an SRS, a PUSCH and an SRS, and/or the like). For example, UE 120 may determine the transmission gap based at least in part on a use case parameter relating to an SRS. For example, UE 120 may determine the transmission gap based at least in part on whether an SRS transmission is for codebook-based precoding, non-codebook based precoding, analog beamforming, antenna switching, and/or the like. In some aspects, UE 120 may determine the use case parameter based on a bit indicator (e.g., a use case flag indicator). For example, UE 120 may receive a flag indicator indicating beam management (e.g., a beamforming use case), codebook precoding (e.g., a codebook precoding use case), non-codebook precoding (e.g., a non-codebook precoding use case), antenna switching (e.g., an antenna switching use case), and/or the like. In this case, UE 120 may determine that the SRS is for uplink codebook-based precoding, uplink non-codebook based precoding, uplink analog beamforming, and/or the like, and may determine that the transmission gap may be less than a threshold, such as having no transmission gap (a zero transmission gap) (e.g., based at least in part on the use case not being sensitive to degradation relating to a lack of a transmission gap). In contrast, UE 120 may determine that the SRS is for antenna switching, and may select a transmission gap that is greater than or equal to the threshold (e.g., based at least in part on the use case being sensitive to degradation relating to a lack of a transmission gap). In some aspects, the transmission gap and/or the threshold may be a particular quantity of seconds, a particular quantity of OFDM symbols, a particular length associated with a numerology, and/or the like. Additionally, or alternatively, UE 120 may determine the transmission gap based at least in part on a numerology parameter. For example, UE 120 may determine the transmission gap based at least in part on a subcarrier spacing, such as whether the subcarrier spacing is 15 KHz, 30 KHz, 60 KHz, 120 KHz, and/or the like.

In some aspects, UE 120 may determine the transmission gap based on an antenna parameter. For example, UE 120 may determine whether the set of transmissions includes a plurality of types of transmissions (e.g., a PUCCH and an SRS, a PUSCH and an SRS, and/or the like) associated with different antennas, a same antenna, and/or the like, as described herein. In some aspects, UE 120 may determine the transmission gap based at least in part on a combination of the use case parameter of the SRS transmission (e.g., of the set of transmissions) and the numerology parameter. For example, for a transmission gap between an PUCCH or a PUSCH and an SRS resource for SRS antenna switching for a 60 Kilohertz (KHz) subcarrier spacing, UE 120 may select a first size for the transmission gap, such as a one symbol transmission gap (e.g., for a scenario wherein an antenna changes between a PUCCH or PUSCH and an SRS transmission immediately succeeding the PUCCH or PUSCH). Similarly, for a transmission gap between an PUCCH or a PUSCH and an SRS resource for SRS antenna switching for a 120 KHz subcarrier spacing, UE 120 may select a second size for the transmission gap, such as a two symbol transmission gap (e.g., for a scenario wherein an antenna changes between a PUCCH or PUSCH and an SRS transmission immediately succeeding the PUCCH or PUSCH). In contrast, for a transmission gap between an PUCCH or a PUSCH and an SRS resource for SRS antenna switching for less than a threshold subcarrier spacing (e.g., 15 KHz, 30 KHz, and/or the like), UE 120 may select a third size for the transmission gap, such as a zero transmission gap.

In some aspects, UE 120 may select from a plurality of candidate transmission gaps when determining the transmission gap. For example, when UE 120 determines that the SRS is used for a plurality of use cases (e.g., for both uplink codebook based precoding and antenna switching), UE 120 may determine each candidate transmission gap associated with each of the plurality of use cases (e.g., a zero transmission gap for uplink codebook based precoding and a one symbol transmission gap for antenna switching). In this case, UE 120 may select a largest transmission gap of the candidate transmission gaps (e.g., the one symbol transmission gap for antenna switching), thereby ensuring that degradation is not caused for the use case associated with the largest transmission gap.

In some aspects, the transmission gap may be a guard period. For example, the transmission gap may be a guard period between using multiple antennas for transmissions (e.g., transmissions by UE 120, transmissions by BS 110, a combination of transmissions by UE 120 and BS 110, and/or the like). In some aspects, the transmissions may be SRS transmissions. For example, UE 120 may transmit an SRS using a power amplifier and an antenna. Additionally, or alternatively, the transmissions may be uplink channels, such as a PUCCH, a PUSCH, and/or the like. For example, UE 120 may determine a transmission gap, or guard period, between a PUCCH and an SRS, a PUSCH and an SRS, and/or the like.

In some aspects, UE 120 may determine the transmission gap based at least in part on a format of a particular type of channel. For example, UE 120 may determine a first transmission gap for a first uplink channel configuration of PUCCH associated with conveying a first size of a payload or using a first waveform, and may determine a second transmission gap for a second uplink channel configuration of PUCCH associated with conveying a second size of a payload or using a second waveform. Further to the example, for PUCCH format type 0 with time division orthogonal cover code (TD-OCC), UE 120 may select a greater transmission gap than for PUCCH format type 1 that does not include TD-OCC. In this way, a guard period between the PUCCH and an SRS is larger when a different transmission antenna is to be used for the PUCCH and the SRS than for when a single transmission antenna is to be used for both the PUCCH and the SRS.

As further shown in FIG. 9, and by reference number 920, UE 120 may transmit in accordance with the transmission gap. For example, UE 120 may transmit at least one transmission, of a plurality of transmissions, using no transmission gap. Alternatively, UE 120 may transmit at least one transmission using a transmission gap, such as using a one symbol transmission gap, a two symbol transmission gap, and/or the like based at least in part on determining the transmission gap.

In some aspects, when a zero transmission gap is configured, UE 120 may perform an antenna cycling procedure. For example, when no transmission gap is configured between a PUCCH transmission or a PUSCH transmission and an SRS transmission, UE 120 may be configured to change antennas for a plurality of iterations of a set of transmissions, as described herein. As shown by reference number 930, for a first transmission of an SRS in a first slot, UE 120 may determine to transmit a PUCCH and a first SRS (SRS1) with a first antenna and without a transmission gap, followed by a second SRS (SRS2) with a second antenna and with a transmission gap. Subsequently, in a second slot and as shown by reference number 940, for a second transmission of the SRS, UE 120 may determine to transmit the PUCCH and the second SRS without a transmission gap, followed by the first SRS with a transmission gap. In this way, UE 120 may average error vector magnitude (EVM) degradation across SRS1 and SRS2 (e.g., SRS1 experiences degradation during the first iteration and SRS2 experiences degradation during the second iteration), thereby reducing a likelihood that either of SRS1 or SRS2 exceeds a threshold level of degradation.

In some aspects, UE 120 may determine whether to perform the antenna cycling procedure to average EVM degradation based at least in part on a capability of UE 120 (e.g., based at least in part on UE 120 being configured to transmit the first SRS consecutive to the PUCCH in the first slot and the second SRS consecutive to the PUCCH in the second slot). Additionally, or alternatively, UE 120 may determine to perform the antenna cycling procedure based at least in part on semi-static signaling, a capability of UE 120, and/or the like. For example, for a UE 120 with multiple transmitters, UE 120 may use a primary antenna and a primary power amplifier for a PUCCH and a secondary antenna and the primary power amplifier to transmit the SRS, which may result in degradation from a lack of a transmission gap. In this case, UE 120 may determine to perform the antenna cycling procedure. In contrast, for a UE 120 with a single transmitter, UE 120 may not experience degradation resulting from the lack of the transmission gap, and may determine not to use the antenna cycling procedure.

As indicated above, FIG. 9 is provided as an example. Other examples may differ from what is described with respect to FIG. 9.

Figure 10:
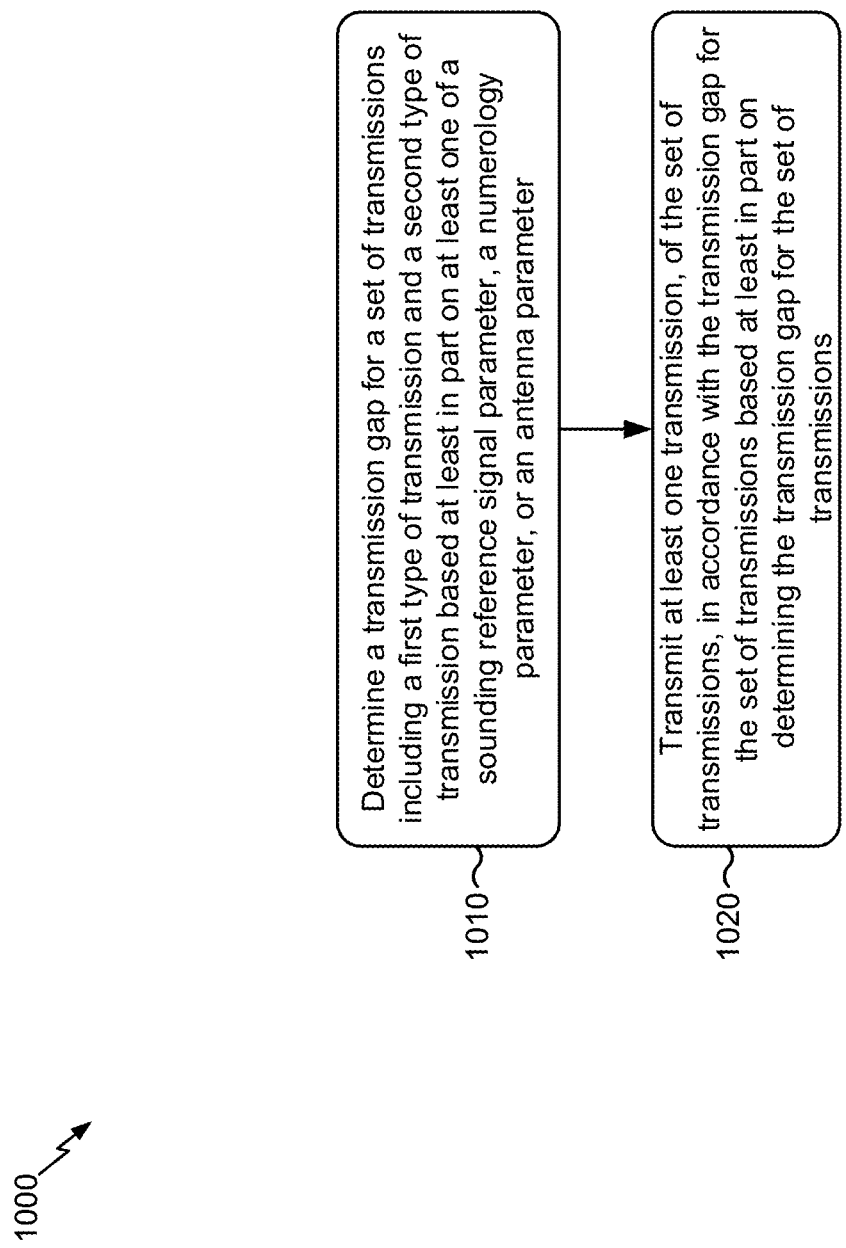
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs transmission gap configuration.

As shown in FIG. 10, in some aspects, process 1000 may include determining a transmission gap for a set of transmissions including a first type of transmission and a second type of transmission based at least in part on at least one of a sounding reference signal parameter, a numerology parameter, or an antenna parameter (block 1010). For example, the UE may determine (e.g., using controller/processor 280, transmit processor 264, TX MIMO processor 266, and/or the like) a transmission gap for a set of transmissions including a first type of transmission and a second type of transmission based at least in part on at least one of a sounding reference signal parameter, a numerology parameter, or an antenna parameter, as described above.

As shown in FIG. 10, in some aspects, process 1000 may include transmitting at least one transmission, of the set of transmissions, in accordance with the transmission gap for the set of transmissions based at least in part on determining the transmission gap for the set of transmissions (block 1020). For example, the UE may transmit (e.g., transmit processor 264, TX MIMO processor 266, modulator 254, antenna 252, and/or the like) the set of transmissions in accordance with the transmission gap for the set of transmissions based at least in part on determining the transmission gap for the set of transmissions, as described above.

Process 1000 may include additional aspects, such as any single aspect and/or any combination of aspects described below and/or in connection with one or more other processes described elsewhere herein.

In some aspects, the antenna parameter relates to at least one antenna selected for the set of transmissions. In some aspects, the transmission gap for the set of transmissions is between a physical uplink control channel transmission and a sounding reference signal transmission. In some aspects, the transmission gap for the set of transmissions is between a physical uplink shared channel transmission and a sounding reference signal transmission. In some aspects, the transmission gap for the set of transmissions is selected as a largest of a plurality of candidate transmission gaps. In some aspects, the plurality of candidate transmission gaps relate to a plurality of use cases associated with the sounding reference signal parameter.

In some aspects, the sounding reference signal parameter is related to at least one of an uplink codebook precoding parameter, an uplink non-codebook precoding parameter, an uplink analog beamforming parameter, or an uplink antenna switching parameter. In some aspects, the sounding reference signal parameter may be a use case flag indicator that indicates at least one of beam management, codebook precoding, non-codebook precoding, or antenna switching. In some aspects, the UE is configured to omit the transmission gap for the set of transmissions based at least in part on determining the transmission gap. In some aspects, the transmission gap is selected from a plurality of candidate transmission gaps corresponding to a plurality of sounding reference signal parameters.

In some aspects, the UE is configured to transmit the first type of transmission and the second type of transmission consecutively and using different antennas for a plurality of iterations, and the UE is configured to transmit at least one of the first type of transmission or the second type of transmission using different antennas for the plurality of iterations. In some aspects, the UE is configured to change the different antennas for the plurality of iterations. In some aspects, the UE is configured to change the different antennas based at least in part on at least one of semi-static signaling or a UE capability.

In some aspects, the UE is configured to determine the transmission gap based at least in part on an uplink channel configuration for a channel of the set of transmissions. In some aspects, the uplink channel configuration includes at least one of a type of the channel or a format of the channel. In some aspects, the uplink channel configuration is related to at least one of a size of a payload conveyed using the channel or a waveform of the channel.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
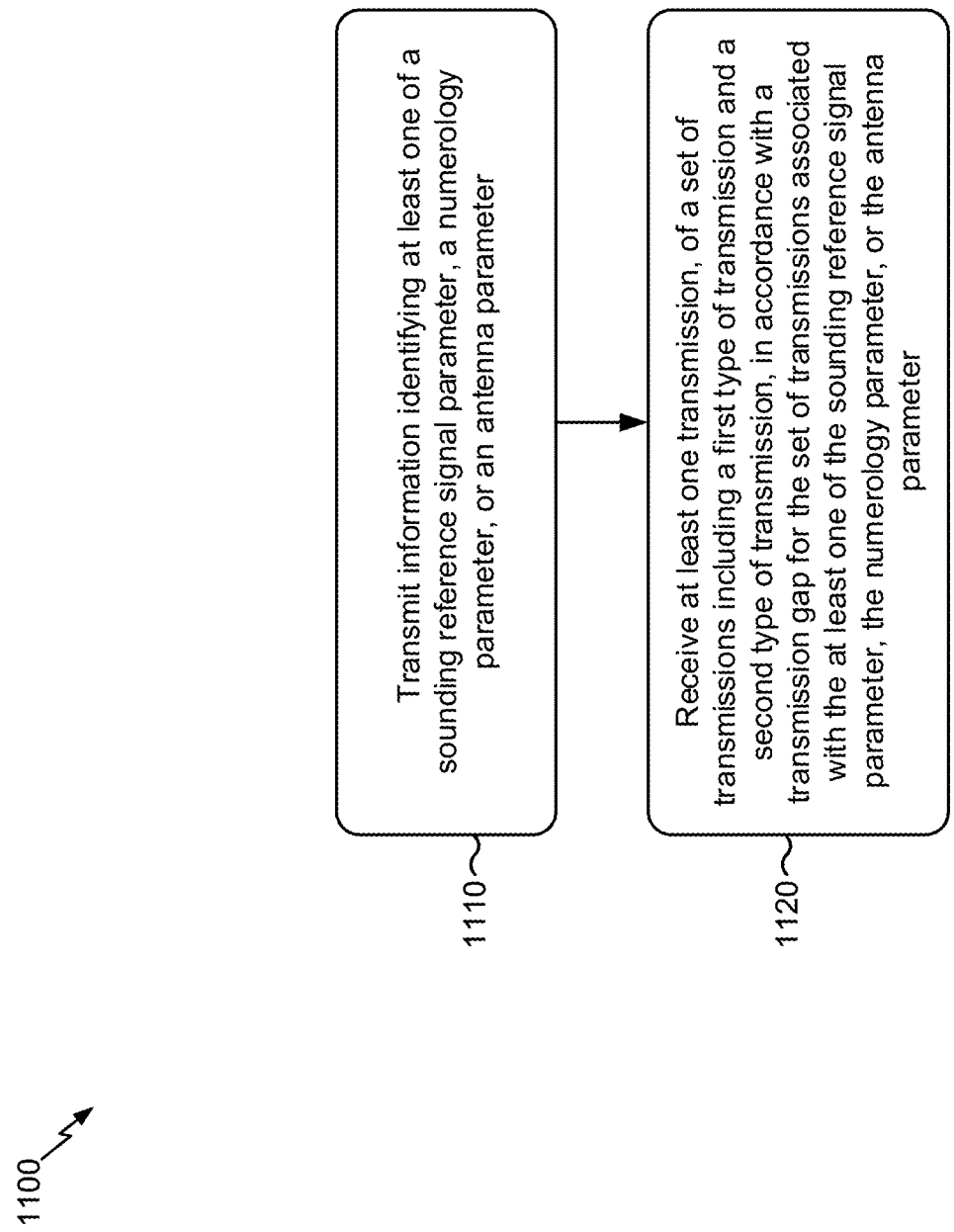
FIG. 11 is a diagram illustrating an example process performed, for example, by a base station, in accordance with various aspects of the present disclosure.

FIG. 11 is a diagram illustrating an example process 1100 performed, for example, by a BS, in accordance with various aspects of the present disclosure. Example process 1100 is an example where a BS (e.g., BS 110) performs transmission gap configuration.

As shown in FIG. 11, in some aspects, process 1100 may include transmitting information identifying at least one of a sounding reference signal parameter, a numerology parameter, or an antenna parameter (block 1110). For example, the BS (e.g., using controller/processor 240, transmit processor 220, TX MIMO processor 230, MOD 232, antenna 234, and/or the like) may transmit information identifying at least one of a sounding reference signal parameter, a numerology parameter, or an antenna parameter, as described in more detail above.

As shown in FIG. 11, in some aspects, process 1100 may include receiving at least one transmission, of a set of transmissions including a first type of transmission and a second type of transmission, in accordance with a transmission gap for the set of transmissions associated with the at least one of the sounding reference signal parameter, the numerology parameter, or the antenna parameter (block 1120). For example, the BS (e.g., using antenna 252, DEMOD 254, MIMO detector 256, receive processor 258, controller/processor 280, and/or the like) may receive at least one transmission, of a set of transmissions including a first type of transmission and a second type of transmission, in accordance with a transmission gap for the set of transmissions associated with the at least one of the sounding reference signal parameter, the numerology parameter, or the antenna parameter, as described in more detail above.

Process 1100 may include additional aspects, such as any single aspect and/or any combination of aspects described below and/or in connection with one or more other processes described elsewhere herein.

In some aspects, the antenna parameter relates to at least one antenna used for the set of transmissions. In some aspects, the transmission gap for the set of transmissions is between a physical uplink control channel transmission and a sounding reference signal transmission. In some aspects, the transmission gap for the set of transmissions is between a physical uplink shared channel transmission and a sounding reference signal transmission.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a transmission gap between a first type of transmission and a second type of transmission, wherein
        the first and second transmissions types are transmitted consecutively, and
        the transmission gap has a first length when the first and second type of transmissions use a same antenna configuration and a second length when the first and second type of transmissions use a different antenna configuration; and
    transmitting at least one transmission based at least in part on determining the transmission gap.

2. The method of claim 1, wherein an antenna configuration relates to at least which antenna is selected for the type of transmission.

3. The method of claim 1, wherein the first and second types of transmission include a physical uplink control channel transmission and a sounding reference signal transmission.

4. The method of claim 1, wherein the first and second types of transmission include a physical uplink shared channel transmission and a sounding reference signal transmission.

5. The method of claim 1, wherein the transmission gap is selected as a largest of a plurality of candidate transmission gaps.

6. The method of claim 1, wherein the UE is configured to omit the transmission gap for the set of transmissions based at least in part on determining the transmission gap.

7. The method of claim 1, wherein an antenna configuration relates to at least which antenna port is selected for the type of transmission.

8. The method of claim 1, wherein an antenna configuration relates to at least which antenna port group is selected for the type of transmission.

9. A user equipment (UE) for wireless communication, comprising:
    a memory; and
    one or more processors operatively coupled to the memory, the memory and the one or more processors configured to:
        determine a transmission gap between a first type of transmission and a second type of transmission, wherein
            the first and second transmissions types are transmitted consecutively, and
            the transmission gap has a first length when the first and second type of transmissions use a same antenna configuration and a second length when the first and second type of transmissions use a different antenna configuration; and
        transmit at least one transmission, of the first and second types of transmissions, based at least in part on determining the transmission gap.

10. The UE of claim 9, wherein an antenna configuration relates to at least which antenna is selected for the type of transmission.

11. The UE of claim 9, wherein the first and second types of transmission include a physical uplink control channel transmission and a sounding reference signal transmission.

12. The UE of claim 9, wherein the first and second types of transmission include a physical uplink shared channel transmission and a sounding reference signal transmission.

13. The UE of claim 9, wherein the transmission gap is selected as a largest of a plurality of candidate transmission gaps.

14. The method of claim 9, wherein an antenna configuration relates to at least which antenna port is selected for the type of transmission.

15. The method of claim 9, wherein an antenna configuration relates to at least which antenna port group is selected for the type of transmission.

* * * * *